Feb. 20, 1934.  E. W. KELLOGG  1,947,543
DAMPED MECHANICAL FILTER
Filed Dec. 3, 1931   2 Sheets-Sheet 1

INVENTOR
EDWARD W. KELLOGG
BY
ATTORNEY

Feb. 20, 1934.  E. W. KELLOGG  1,947,543
DAMPED MECHANICAL FILTER
Filed Dec. 3, 1931   2 Sheets-Sheet 2
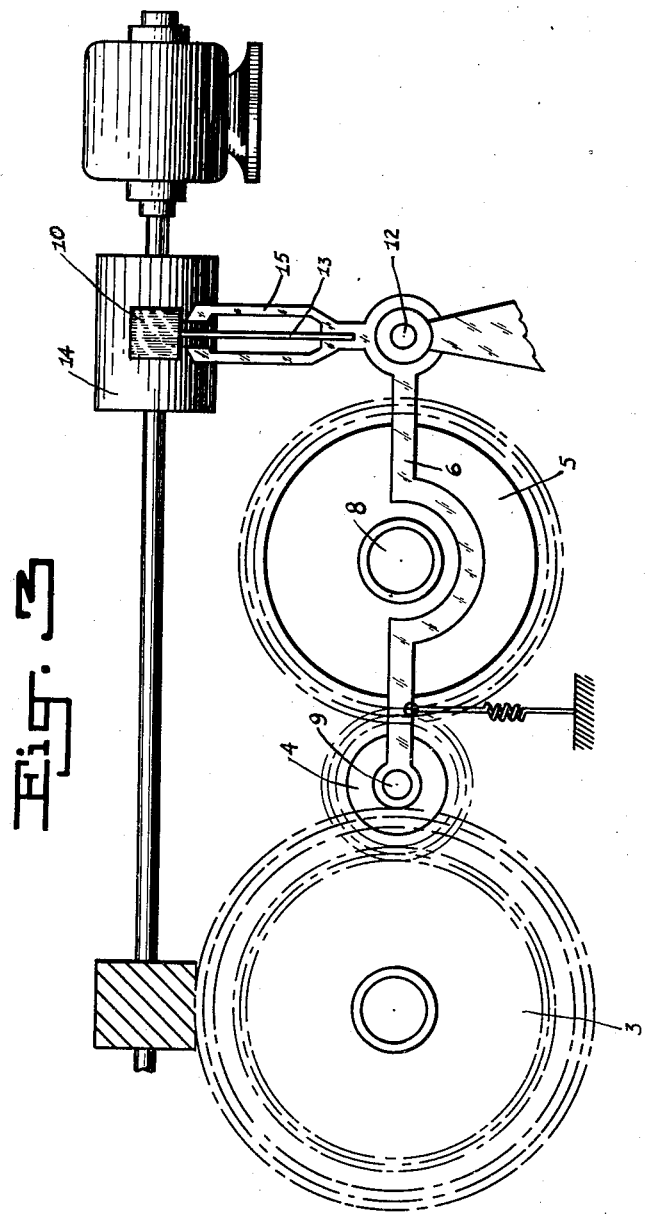
INVENTOR
EDWARD W. KELLOGG
BY
ATTORNEY Patented Feb. 20, 1934

1,947,543

UNITED STATES PATENT OFFICE 1,947,543

DAMPED MECHANICAL FILTER

Edward W. Kellogg, Moorestown, N. J., assignor to Radio Corporation of America, a corporation of Delaware Application December 3, 1931. Serial No. 578,687

4 Claims. (Cl. 74—7)

This invention relates to apparatus for securing uniform rotation of a shaft in spite of imperfections of gearing in the driving system, and more particularly to such an apparatus which functions by absorbing irregularities in the motion transmitted to it.

Such apparatus finds particular utility in the sound-reproduction art, and particularly in that branch of the art where the sound is recorded on and reproduced from photographic film having but little inertia to steady its motion.

Heretofore, a flywheel has been mounted upon the shaft which is to rotate uniformly and the driving power has been supplied through a spring. This arrangement is often referred to as a "mechanical filter". Such a system tends to oscillate or "hunt" and it therefore has become necessary to provide means for damping out such oscillations. The damping may be provided in various ways, but may be most simply and satisfactorily applied if the elastic element is stationary. To this end I have provided an arrangement of gearing by which relative movements of two rotating gears, or momentary variations in the speed of either of said gears are taken up by a stationary spring which resists displacements of an intermediate or idler gear. I have also provided a special arrangement for damping, such that all movements of the position of the idler gear are resisted by a force substantially proportional to the velocity of said movements.

One object of the present invention is to provide means for transmitting power uniformly to a rotating member.

Another object of the invention is to provide means for absorbing irregularities in the motion of a driving member.

Another object of the invention is to provide means for damping any oscillations which occur or tend to occur in the speed of the driven member.

Another object of my invention is to provide extremely simple damping means which is not dependent upon electromagnetic action nor upon viscosity of fluids.

In the drawings:

Fig. 3 is a diagrammatic illustration of a third form of the invention.

Figure 1:
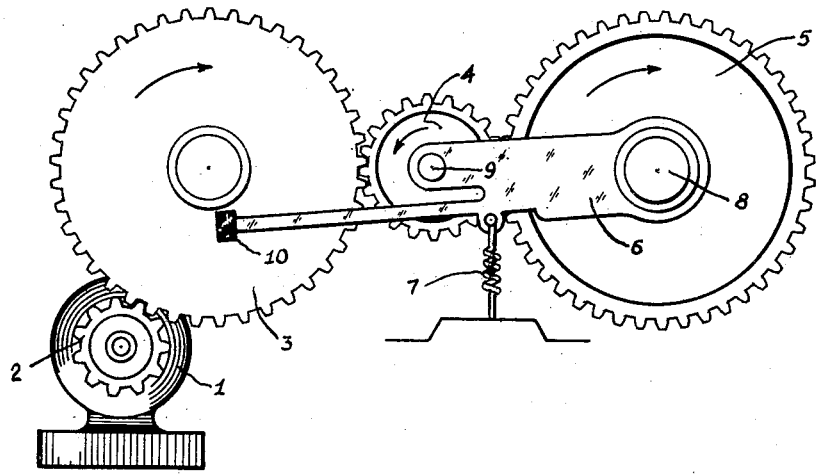
Fig. 1 is a diagrammatic illustration of one form of the invention.

Referring first to the form of the invention shown in Fig. 1,— 1 indicates a source of power, such, for example, as an electric motor and carrying upon its shaft a gear 2. The gear 2 drives the gear 3, which has a flat, smooth surface on one of its faces, in a clockwise direction, and the gear 3 drives the idler-gear 4 and thereby the gear 5.

The gear 5 is mounted upon the shaft 8 which is to be driven at a constant speed and which is preferably provided with a flywheel, or the gear 5 may itself constitute a flywheel. The arm 6 is revolubly mounted upon a pivot which for convenience may be coaxial with the shaft 8 and carries the shaft 9 of the idler gear 4 and the pressure-pad 10 which presses upon the flat face of the gear 3.

If the peripheral speed of the gear 3 is not constant but varies, due to imperfections in gearing or other causes, the gear 4 will tend to shift slightly in such a manner as to take up these irregularities. The force applied to the periphery of gear 5 depends upon the spring 7. This spring may be so designed that small movements of gear 4 will not result in appreciable changes in the tangential force applied to gear 5. The result is that this force is very nearly constant, whereas if the idler gear 4 were fixed in position, large variations in force could be transmitted from gear 3 to gear 5 as a result of variations in the peripheral speed of gear 3. The possibility of hunting may be readily understood if for the time being, we consider that the pressure pad 10 is not applied and therefore that the only resistance to movement of the axis of gear 4 is due to the spring 7. Under these conditions if any disturbance occurs which causes the gear 5 and its flywheel momentarily to run at too low a speed, the gear 3 meantime running at approximately uniform speed, the idler gear will move downward. Gear 4 will presently reach a position below its normal operating position in which the compression of spring 7 is such that the force applied to gear 5 is in excess of the average force required to maintain its motion. This excess force will accelerate gear 5 and the flywheel. Gear 4 will not begin to rise until gear 5 has been brought up to normal speed. Gear 5 must run above normal speed in order for gear 4 to rise in position and up to the time gear 4 reaches normal position gear 5 continues to be accelerated. It is therefore above normal speed when gear 4 reaches normal position and gear 4 continues to rise and spring 7 begins to pull back, retarding gear 5 again. This describes the oscillation or "hunting" of the system. The alteration of excess and deficient speed of gear 5 may continue through a good many cycles unless damping is provided.

Ordinary dry friction which might be provided by means of a brake shoe attached to rocker arm 6 and rubbing against a stationary surface would damp out "hunting" but since such brake friction has a minimum value not dependent upon velocity of relative motion, the result would be that arm 6 would come to rest at some point other than that at which the spring 7 is taking up the entire thrust. The friction will then hold the arm stationary provided the forces developed are not in excess of the critical value for the brake. The system then becomes ineffective as a filter. If for a moment a force is exerted sufficient to cause the brake to slip, the arm 6 will jump to the new position. This jerky action may transmit worse disturbances to gear 5 and its associated flywheel than as if there were no filter. In view of the foregoing it is not desirable to attempt to provide damping by means of a brake acting against a stationary surface. If, on the other hand, a brake is applied against a surface which is in continuous motion, there is no possibility of the brake locking in a certain position. If the continuous motion is approximately at right angles to the direction of oscillatory movement of the brake shoe the frictional force resisting movement of the brake shoe will be approximately proportional to the velocity of movement of the said brake shoe. A resisting force depending on velocity and approaching zero as the velocity approaches zero is the ideal means of damping. Such a damping means may be obtained by means of a dashpot or by employment of viscous fluids or by electro-magnetic means. Adequate electro-magnetic damping calls for powerful and heavy magnets while the use of fluids introduces the problem of retaining them where they are wanted, or avoidance of spilling and creeping, and also the problem of change in viscosity with temperature. The arrangement employed in this invention is free from these objections since it employs ordinary rubbing friction and works well if the surface is dry. The action is not impaired if the surface is oily or greasy although it may become necessary to increase the normal pressure to make up for a reduction in coefficient of friction.

The pressure-pad 10 is preferably provided with a dry leather surface to co-operate with the surface of the gear 3.

It will be noted that the face of the driving gear against which the pad rubs is moving substantially radially with respect to the swivel, and any up and down movement of the idler gear results in a component of friction at right angles to that due to the steady rotation of the driving gear. This results in a resistance to movement of the idler proportional to the velocity of the movement and therefore provides a desirable means of damping.

Figure 2:
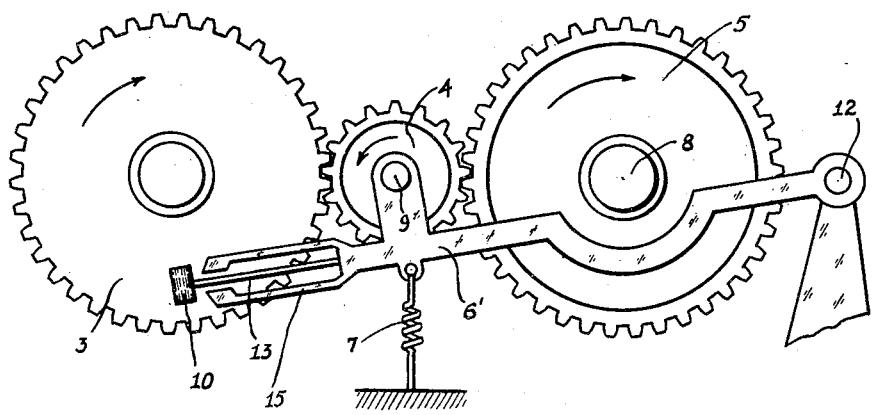
Fig. 2 is a diagrammatic illustration of a second form of the invention.

In the form of the invention shown in Fig. 2, which is the preferred form, parts which are similar in construction and operation to those in Fig. 1 are indicated by similar reference numerals and will not be again specifically described.

In this form of the invention, the arm 6' is carried by an external pivot 12 instead of being pivoted upon the shaft, as the increased length of the arm facilitates the proper design of the gear-teeth of the wheels 3, 4 and 5. The arm 6' is further provided with a slightly-flexible portion 13, as the provision of slight flexibility in the connection between the damping element and the remainder of the yielding structure provides better filtering of small rapid pulsations and there is only a slight sacrifice in damping.

For example, if the gear-teeth on the wheels 3, 4 and 5 are not theoretically perfect there will be a tendency to produce irregularities in the motion of the wheel 5 at the gear-tooth frequency; but if the member 13 is of suitable flexibility, the arm 6' with the gear 4 can execute small movements to compensate for the irregularities, without having to overcome the resistance of the brake shoe 10. At the same time the effectiveness of the brake in damping out the slow oscillations characteristic of hunting, is not appreciably impaired by the introduction of some flexibility at 13. In fact the employment of the flexible member 13 makes it possible to use stronger damping and thereby to more quickly suppress oscillations, without sacrificing the effectiveness of the filtering system to more rapid fluctuations in the speed of the driving gear 3.

In Fig. 3 I have shown an arrangement in which the brake shoe moves approximately parallel to the axis of a rotating cylinder. I have shown in Figs. 2 and 3, guards to prevent injury to the spring 13, such as might occur during starting or stopping or upon any excessively violent acceleration. The presence of these guards also slightly increases the damping of the transient oscillations of large amplitude which may occur during starting.

It will be apparent that I have thus provided a mechanical filter which is capable of absorbing, preventing, or otherwise eliminating speed irregularities, periodic vibrations, or oscillations, in the transmission of power to a rotating member, wherefore;

I claim:

1. A mechanical filter comprising a driving gear, a driven gear, a spring-supported idler gear therebetween, damping means for preventing oscillations of said idler, said damping means comprising a pressure-pad co-operating with a face of said driving gear and movable substantially radially thereof.

2. A mechanical filter comprising a driving gear, a driven gear, a spring-supported idler gear therebetween, damping means for preventing oscillations of said idler, said damping means comprising a pressure-pad cooperating with a continuously moving surface of said driving gear and movable substantially radially thereof.

3. A mechanical filter comprising a driving gear, a driven gear, a spring-supported idler gear therebetween, damping means for preventing oscillations of said idler, said damping means comprising a pressure-pad cooperating with a face of said driving gear and movable substantially radially thereof, and a movable arm extending substantially radially of said driven gear and carrying said idler gear and said damping means.

4. A mechanical filter comprising a driving gear, a driven gear, a spring-supported idler gear therebetween, damping means for preventing oscillations of said idler, said damping means comprising a pressure-pad cooperating with a face of said driving gear and movable substantially radially thereof, and a movable arm extending substantially radially of said driven gear and carrying said idler gear and including yieldable means supporting said damping means.

EDWARD W. KELLOGG.